US009481518B2

(12) United States Patent
Neiser (10) Patent No.: US 9,481,518 B2
(45) Date of Patent: Nov. 1, 2016

(54) ORDER FULFILLMENT SYSTEM AND METHOD

(71) Applicant: Intelligrated Headquarters LLC, Mason, OH (US)

(72) Inventor: Raymond R. Neiser, Batavia, OH (US)

(*) Notice: Subject to any disclaimer, the term of this patent is extended or adjusted under 35 U.S.C. 154(b) by 0 days.

(21) Appl. No.: 14/187,591

(22) Filed: Feb. 24, 2014

(65) Prior Publication Data

US 2014/0244026 A1 Aug. 28, 2014

Related U.S. Application Data

(60) Provisional application No. 61/768,522, filed on Feb. 24, 2013.

(51) Int. Cl.
*G06F 7/00* (2006.01)
*B65G 1/137* (2006.01)

(52) U.S. Cl.
CPC ........... *B65G 1/1373* (2013.01); *B65G 1/1378* (2013.01)

(58) Field of Classification Search
CPC .................................................. B65G 1/1373
USPC ......................................................... 700/216
See application file for complete search history.

(56) References Cited

U.S. PATENT DOCUMENTS

| 4,978,274 | A | | 12/1990 | De Groot | |
|---|---|---|---|---|---|
| 5,690,209 | A | | 11/1997 | Kofoed | |
| 5,880,443 | A | * | 3/1999 | McDonald | B65G 1/045 198/347.2 |
| 8,240,973 | B2 | | 8/2012 | Xu et al. | |
| 8,447,426 | B2 | | 5/2013 | Mougin et al. | |
| 2002/0017537 | A1 | * | 2/2002 | Barklin | B65G 17/345 222/240 |
| 2010/0241269 | A1 | * | 9/2010 | Ham | G06Q 10/06315 700/214 |
| 2012/0328397 | A1 | | 12/2012 | Yamashita | |
| 2013/0018503 | A1 | * | 1/2013 | Carson | B65B 57/16 700/216 |
| 2013/0223959 | A1 | * | 8/2013 | Koholka | B65G 1/137 414/267 |
| 2013/0340390 | A1 | * | 12/2013 | Carson | B25J 9/0096 53/411 |

FOREIGN PATENT DOCUMENTS

| EP | 1231170 | 8/2002 |
|---|---|---|
| WO | WO 2006/065147 | 6/2006 |

OTHER PUBLICATIONS

International Search Report and Written Opinion dated Jul. 4, 2014 for Application No. PCT/US2014/017991.

* cited by examiner

*Primary Examiner* — Kyle Logan (57) ABSTRACT

An order fulfillment system and method uses a robotic arm having an end effector for grasping an object. An arcuate structure is moveable within reach of the robotic arm. A conveyor system brings inventory to the arcuate structure and takes a container that holds picked inventory away from the arcuate structure. A control system fulfills an order by directing the conveyor system to bring inventory to the arcuate structure, positioning the inventory on the arcuate structure relative to the robotic arm, determining a selected inventory item for an order, commanding the robotic arm to move the selected inventory item from a pick location of the selected inventory item to a container location for the order, and directing the conveyor system to take the container from the arcuate structure.

36 Claims, 4 Drawing Sheets

ORDER FULFILLMENT SYSTEM AND METHOD

RELATED APPLICATIONS

The present application claims the benefit of priority to U.S. Provisional Application No. 61/768,522, entitled "Goods to Robot for Order Fulfillment" filed Feb. 24, 2013, the entire contents of which are hereby incorporated by reference.

TECHNICAL FIELD

The present disclosure relates generally to order fulfillment systems and methods, and is more particularly directed to such systems and methods which fulfill an order by using a robot arm to pick inventory from one or more inventory containers (containing inventory) and to place the picked inventory into an empty container in the fulfillment of the order.

BACKGROUND

Automation is used to increase the productivity of operators who perform order fulfillment. A category of automation termed "goods-to-operator" seeks to reduce the time that the operator spends moving to a location where the inventory item is for a pick by bringing the particular inventory item to the operator. Various carousel and mobile robotic approaches have been proposed for moving the inventory. Feedback to the operator via light or voice cues are also used to reduce the time required to pick. Similar techniques are generally known for replenishing inventory ("put operations").

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a method for order fulfillment by directing a conveyor system to bring inventory to an arcuate structure that is moveable within reach of a robotic arm having an end effector for grasping an object, positioning the inventory on the arcuate structure relative to the robotic arm, determining a selected inventory item for an order, commanding the robotic arm to move the selected inventory item from a pick location of the selected inventory item to a container location for the order, and directing the conveyor system to take the container from the arcuate structure.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

The present innovation relates generally to a method and apparatus for order fulfillment by bringing selected inventory items to a robot for picking, although aspects disclosed herein may have general application to goods-to-operator solutions wherein the picker is a human operator. Efficiently bringing the items to pick to a robot allows the robot to have a large variety of items to pick from and a large number of items to pick to all within the reach of the robot.

In a particular aspect, proximity of inventory to the robot arranged in an arc eliminates the need to horizontally move a gantry that supports the robot, simplifying the installation of the robot. In one embodiment, the arc is a ring. Alternatively or in addition, a conveyor arrangement to bring product to and take product away from this particular picking arrangement is simplified for a more economic order fulfillment operation.

As used herein, a gantry robot is mounted to infrastructure (e.g., floor, ceiling, superstructure, etc.) rather than being freewheeling and mobile.

In one aspect, a turntable that surrounds the robot moves in order to align an open spot with a conveyor to feed in new inventory and to induct a position on the turntable with a completed order to a conveyor to discharge for shipping or for additional picking at another station. The turntable may also be rotated to optimize time required to do picking, coordinating movement of the robotic arm with the relative position of a selected inventory item.

This "ring-around-the-robot" arrangement is very consistent with a capability of a gantry robot because the gantry robot can actually be picking from and putting to these different positions while the turntable is in motion to accept or eject an item. The robot doesn't lose any efficiency at all because of the fact that items are being repositioned. Because it's using the entire radius around the robot, the opportunity to have a much higher population presented to the robot at any given time is tremendous. There are more items available to pick from and more items available to put to at any given time for the robot. That allows much more efficient picking and putting.

Another aspect of it is that this ring around the robot approach may also be a multi-tiered approach (e.g., two or more). Another ring within the reach of the robotic arm (operating envelope space), such as at a different elevation, such as at a larger or smaller distance provides another set of inventory the robot could be picking from and putting to.

The tiered approach maximizes the variety that can be in front of the robot at any given time. If you have a product that might be required to fill five (5) different orders, there is a higher likelihood the robot can pick and satisfy the requirement for the five (5) different orders in a shorter amount of time. The requirement is obviated to convey the product to another zone or wait for other orders to eventually come in front of the robot. The robot is much more efficient, minimizing the number of different pods that would be required. The throughput for a given robot becomes the limiting factor by avoiding wait times for the robot.

As used in this application, the terms "component" and "system" are intended to refer to a computer-related entity, either hardware, a combination of hardware and software, software, or software in execution. For example, a component can be, but is not limited being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Figure 1:
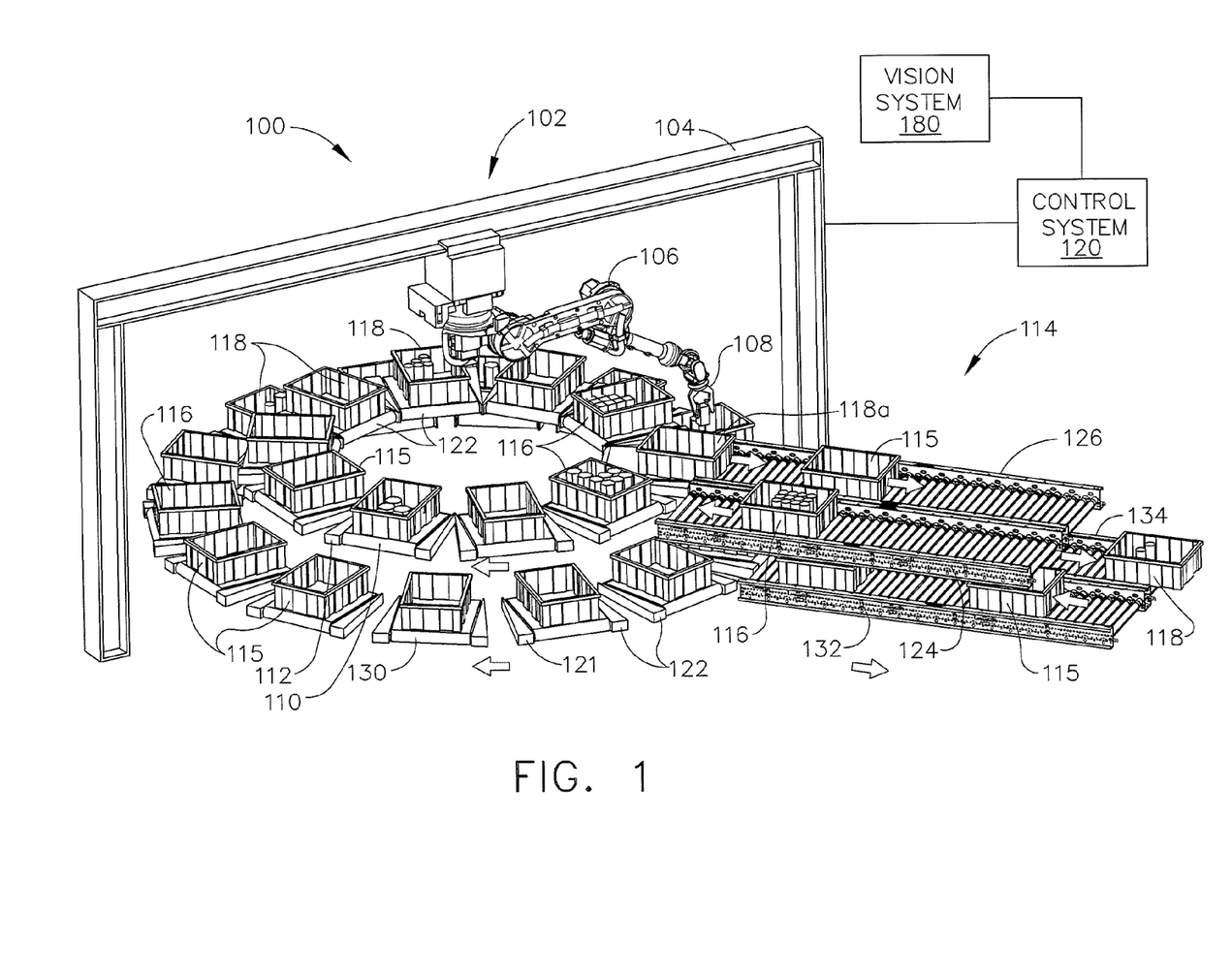
FIG. 1 illustrates a perspective diagram of a picking station of an order fulfillment system according to one aspect of the innovation

Referring initially to the drawings, FIG. 1 illustrates an order fulfillment system 100 having a picking station 102 serviced by a gantry robot 104 whose robotic arm 106 has an end effector 108 grasping an object such as a selected inventory item. Any suitable robot or robotic arm may be used. The gantry robot 104 can fulfill orders by picking objects from inventory that may be moving, and placing the picked objects into an order. Objects can comprise goods for sale, and can include boxes, cartons, bottles, pouches or any other items for an order. As shown, the robotic arm 106 is supported over the picking station 102 in a central position, but the support thereof is not limited thereto, or to the overhead location.

An arcuate structure 110, depicted as an upper ring turntable 112, is rotatable within reach of the robotic arm 106. A conveyor system 114 brings inventory to the arcuate structure 110 for order fulfillment, and takes inventory and orders away from the arcuate structure 110 such as in a container as described below. In the illustrative depiction, conveyor system 114 services the rotating upper ring turntable 112 with a dedicated inbound conveyor 124, and a dedicated outbound conveyor 126. The inbound conveyor 124 brings inventory into the upper ring turntable 112 for picking and placing, and the outbound conveyor 126 takes unused inventory and filled orders away.

Upper ring turntable 112 can be a rotating structure comprising circular groupings of drive elements 121 which can include, but are not limited to, cross belt conveyors 122. An exemplary cross belt conveyor can be found in U.S. Pat. No. 5,690,209, which is hereby incorporated by reference in its entirety. The upper ring turntable 112 can include a structure to support the drive elements 121 such as, but not limited to the rail structure described in U.S. Pat. No. 5,690,209. Drive elements 121 may be any suitable configuration, such as drive rollers, belts, or powered wheels that can move articles onto and off of the rotating upper ring turntable 112. As shown, each cross belt conveyor 122 can move articles thereon in at least either direction along a radius of the rotating ring of the upper ring turntable 112. As depicted, upper ring turntable 112 can rotate in a clockwise direction underneath the overhead gantry robot 104.

Figure 2:
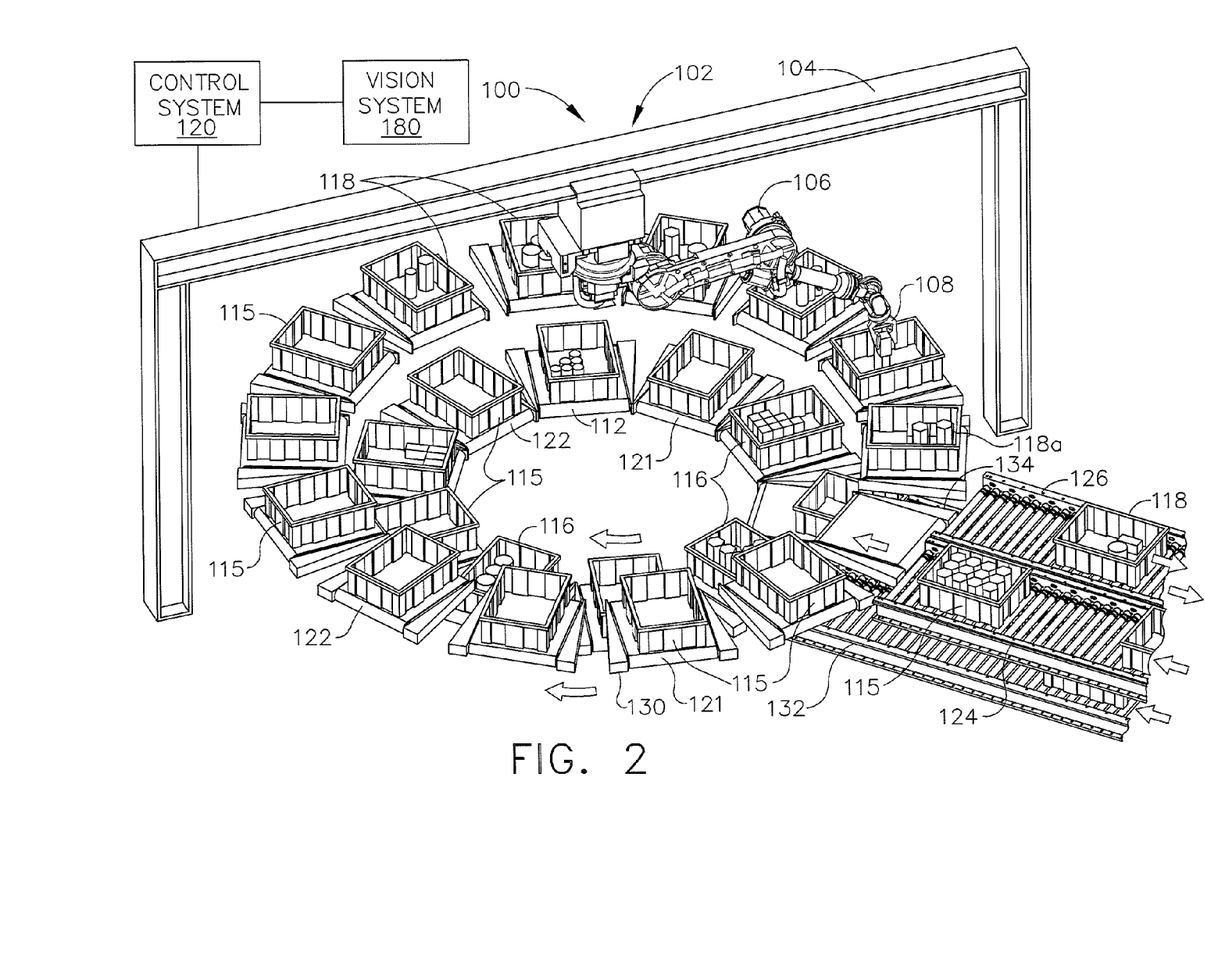
FIG. 2 illustrates a perspective diagram of an alternate embodiment of a picking station of an order fulfillment system according to another aspect of the innovation.

Containers can be used to move inventory and orders through the order fulfillment system 100. For discussion purposes below, there are three types of containers that move through the order fulfillment system 100: empty containers 115, inventory containers 116 that hold inventory available for picking, and order containers 118 that hold inventory picked specifically for an order. All types of containers are shown in FIGS. 1 and 2, with picked objects shown in order containers 118 and inventory shown in inventory containers 116. Empty containers 115 can be brought into the order fulfillment system 100 specifically to receive an order, or can be created by removing the inventory from an inventory container 116 or an order container 118 with the robot arm 106. Once a container is emptied of inventory, the empty container 115 can be exited from the order fulfillment system 100 or dedicated to an order and can continue to rotate on upper ring turntable 112 until the order is fulfilled.

Containers 115, 116, 118 may be any suitable configuration such as boxes, totes and cartons, and can be used to receive, hold and convey inventory as it moves through the order fulfillment system 100. Inbound conveyor 124 can bring in order containers 118, inventory containers 116 and empty containers 115, and outbound conveyor 126 can take out empty containers 115, inventory containers 116 and order containers 118. Upper ring turntable 112 may contain any of the following: empty containers 115, inventory containers 116 and order containers 118.

In FIG. 1, order container 18a is fulfilled and is being moved onto the outbound conveyor 126 for further processing such as mailing. Inventory container 116 is shown approaching the upper ring turntable 112 on inbound conveyor 124 and will occupy the cross belt conveyor 122 when order container 118a exits and the emptied cross belt 122 rotates into position.

A control system 120 can be provided to ensure inventory delivery, choreograph the picking and processing of orders from moving containers, and manage the flow of traffic into, though, and out of the fulfillment system 100. Control system 120 controls the robot arm 106, the inbound conveyor 124, the outbound conveyor 126, the cross belts 122, and the rotating upper ring turntable 112 to orchestrate the overall movement of elements of the order fulfillment system 100 as inventory is picked from inventory containers 116, moving or stationary, and deposited into a container (an empty container 115 if the first item of inventory deposited therein or an order container 118) to create a fulfilled order in an order container 118. A vision system 180 can connect to the control system 120 and can determine a selected inventory item for an order, provide edge recognition of objects in moving containers, identify container locations within the order fulfillment system 100, and can determine whether the robot arm 106 has grasped an object.

The control system 120 can cause the fulfillment of an order by directing the conveyor system 114 to bring inventory to the arcuate structure 110. The control system 120 can position the inventory on the arcuate structure 110 relative to the robotic arm 106, such as by moving the arcuate structure 110, moving the robot arm 106 to be adjacent to the inventory to be picked, or by rotating the arcuate structure so that an empty cross belt 122 thereon can receive the inventory from the inbound conveyor 124. A selected inventory item for an order can be determined as being in one of the inventory containers 116 on the rotating arcuate structure 110 by the control system 120. The control system 120 can command the robotic arm 106 to a pick location of the selected inventory item (such as an inventory container 116 containing the selected inventory item) and can move the selected inventory item to a container location for the order (such as an order container 118). The control system 120 can direct the conveyor system 114 to take the order container 118 containing the selected inventory item from the arcuate structure 110. In the illustrative depiction, a dedicated inbound conveyor 124 and outbound conveyor 126 service the upper ring turntable 112, with an inventory container 116 inbound on the inbound container 124, and an empty container 115 and an order container 118a being taken away by outbound conveyor 126. Control system 120 may comprise a processing system which performs operations by executing instructions to cause order fulfillment system 100 to function as described herein.

Whereas the above description is for picking and placing in the fulfillment of an order, the picking and placing operations within, the picking station 102 can also be used for other tasks such as the replenishment of inventory stored elsewhere, and can return partially full containers to a storage location. The picking station 102 can also be used for condensation and re-organizing of inventory. For example, two half full containers of one inventory item can be combined into a single container containing all of the inventory items and the single combined container is returned to a storage location.

The arcuate structure 110 may have more than one level, as depicted in FIG. 1, and a second arcuate structure, lower ring turntable 130, may be located circumferentially lower than the upper ring turntable 112 to provide greater storage proximate to the gantry robot 104. It should be appreciated that more levels may be implemented. Lower ring turntable 130 can rotate in the same direction as upper ring turntable 112 and may be serviced by conveyor system 114 through a dedicated lower inbound conveyor 132 and a dedicated lower outbound conveyor 134. As shown, but not limited thereto, the dedicated inbound conveyor 124 and the dedicated lower inbound conveyor 132 can bring in inventory containers 116 and empty containers 115, and the outbound conveyor 126 and outbound lower conveyor 134 can take out empty containers 115, inventory containers 116 and order containers 118. Alternately, each of the upper ring turntable 112 and the lower ring turntable 130 can rotate in opposite directions.

Like the upper ring turntable 112 described above, the lower ring turntable 130 can comprise the same groupings of drive elements which can include, but are not limited to, cross belt conveyors 122. For this embodiment, the lower ring turntable 130 and upper ring turntable 112 comprise two rotating rings with each comprising empty containers 115, inventory containers 116 and order containers 118. Whereas both the upper ring turntable 112 and the lower ring turntable 130 depicted as rotating in the same direction, the rings 112, 113 can rotate in opposite directions.

In FIG. 1, the arcuate structure 110 comprising the upper ring turntable 112 and the lower ring turntable 130 are shown as a convex structure with the upper ring turntable 112 having a greater height from the floor than the lower ring turntable 130. Alternately, as shown in FIG. 2, the ring turntable 112 can be closer to the floor than the ring turntable 130 resulting in the concave shape as depicted in FIG. 2.

In the embodiment shown in FIG. 2, the lower ring turntable 112 is dedicated to conveying inventory containers 116, and the upper ring turntable 130 is dedicated to conveying order containers 118. That is, lower ring turntable 112 supplies inventory in inventory containers 115 for the robot arm 106 to pick from, and upper ring turntable 130 collects the picked inventory in order containers 118. With respect to the conveyor system 114 of FIG. 2, the inbound conveyor 124 conveys empty containers 115 in, and the outbound conveyor 126 conveys fulfilled orders out. Likewise, the lower inbound conveyor 132 brings in inventory containers 116, and the lower outbound conveyor 134 removes empty containers 115 and unneeded inventory containers 116.

Figure 3:
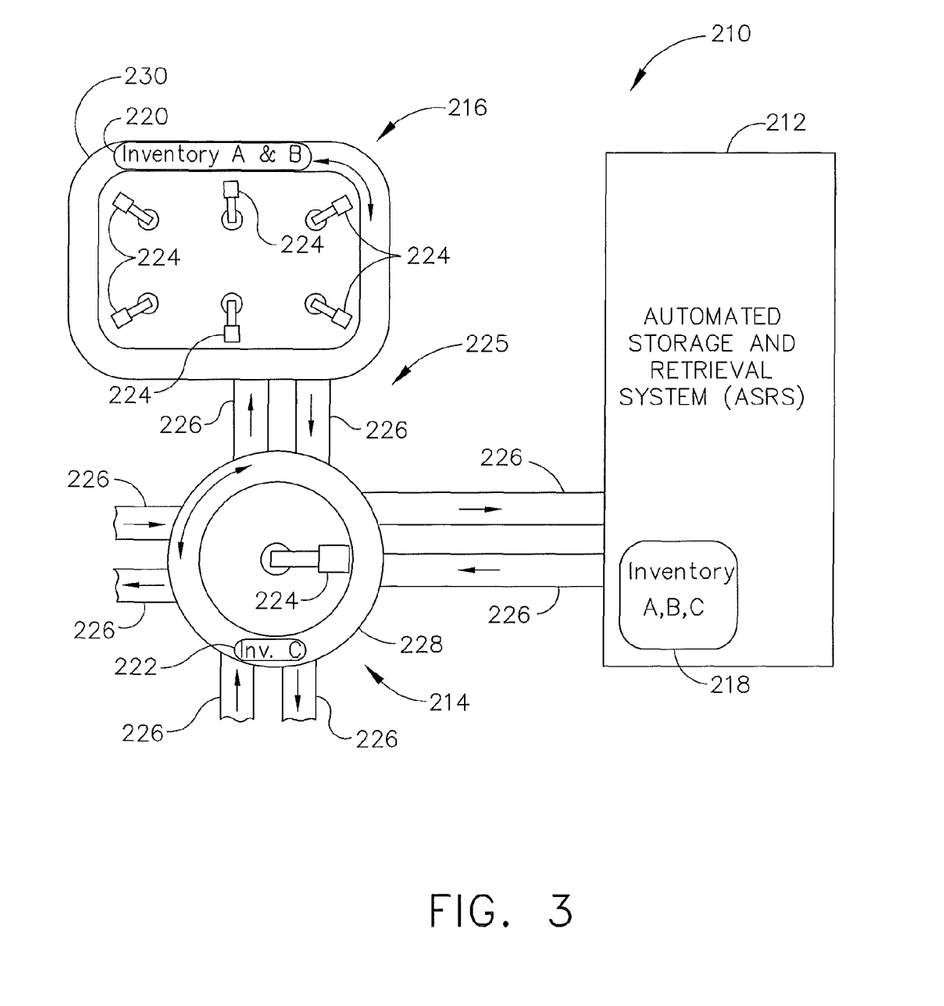
FIG. 3 illustrates a plan view diagram of cooperative picking stations of another order fulfillment system according to another aspect of the innovation.

In FIG. 3, an order fulfillment system 210 in one aspect illustrates collaboration between an automated storage and retrieval system 212 (ASRS), a first picking station 214 and a second picking station 216. As shown, the first picking station 214 and second picking station 216 can include one or more gantry robots 224 for picking and placing inventory, and the ASRS 212 can comprise a multi-level storage structure containing inventory A, B, C. Inventory A, B, C can be stored in inventory containers 116, and empty containers 115, inventory containers 116 and full or partially full order container 118 can be stored in the ASRS 212. Inventory containers 116 may be brought out of the ASRS 212, and delivered to the first picking station 214 and second picking station 216 for order fulfillment and picking. Once orders are filled, the un-picked inventory can be returned to the ASRS 212 in inventory containers 116 for re-storage. An exemplary ASRS 212 can be found in U.S. Patent Application Publication No. 2012/0328397 A1, which is hereby incorporated by reference in its entirety.

The first picking station 214 can comprise the arcuate structure described previously, and can have one or more levels. The second picking station 216 can comprise a second arcuate structure having one or more levels. In the embodiment depicted, the first picking station 214 is shown as a circle and the second picking station 216 as a rectangle with arcuate corners. Both first picking station 214 and second picking station 216 can be any arcuate shape that can move inventory. It is noted that the arcuate corners could be right angle transfers. As used herein, arcuate includes shapes having a plurality of straight segments. A conveyor system 225 may have conveyors 226 which are shown radiating radially out as opposite directional pairs from the first picking station 214, and can extend outward on one or more levels. As shown, paired conveyors 226 extend between first picking stations 214 and second picking station 216 and can extend on multiple levels therebetween. Other pairs of conveyors 226 can extend radially outward from the first picking station 214 and can connect to other elements of the order fulfillment system such as another ASRS (not shown), other picking stations (not shown) shipping and packing stations for the picked orders, and truck unloading bays receiving inventory for storage in the ASRS 212. Traffic flow through the order fulfillment system 210 is orchestrated by levels and each level can move empty containers, inventory containers and order containers in the same direction as other levels, or in opposite directions from other levels. Double headed arrows are provided to show that flow directions in each level can be different.

As depicted, the first picking station 214 is generally central, and can act as a picking and placing station, or can act as a central roundabout to route empty containers, inventory containers and order containers to other destinations. For example, the first picking station 214 can simultaneously pick inventory from inventory containers and deposit the inventory in order containers while acting act as a roundabout to physically route order containers from the ASRS 212 to the second picking station 216. Additional duties of the first picking station 214 and second pick station 216 can include inventory replenishment for the ASRS 212 by routing inventory to the ASRS 212 or by mixing or condensing inventory from a number of containers into fewer containers.

For example, the ASRS 212 may contain inventory A, B, C 218 of which a portion of inventory A and B 220 is picked or replenished at the second picking station 216 and a portion of inventory 222 is picked or replenished at the first picking station 214. Thereby, a large number of different types of inventory items may be picked from for an order, or picked to replenish the ASRS. To that end, a conveyor system 225 may have conveyors 226 that can route between each of the picking stations 214, 216 and replenished at the first picking station 214. Thereby, a large number of different types of inventory items may be picked from for an order. To that end, a conveyor system 225 may have conveyors 226 that can route between each of the picking stations 214, 216.

A control system 250 can be connected to any or all of the order fulfillment system 210, the ASRS 212, the first picking station 214, the second picking station 216 and the conveyors 226. Control system 250 can control the traffic flow of inventory, empty and order containers, control the direction and speed of conveyors 226, the picking and placing operations in the first picking station 214 and second picking station 216, the inventory in the ASRS 212, and the ordering and replenishment of inventory throughout the order fulfillment system 210. A vision system 280 can be placed at any location in the order fulfillment system 210 to provide information to the control system 250.

In another aspect, the order fulfillment system 210 depicts collaboration between multiple gantry robots 224 in the second picking station 216. Each robot 224 may be assigned a portion of the second picking station 216. For example, the first picking station 214 may utilize a rigid ring turntable 228 and the second picking station may comprise a non-circular loop 230. Gantry robots 224 can comprise one or more of a conventional multi axis movement robot arms such as the arm 106 depicted in FIG. 1, or a SCARA robot arm (Selective Compliance Articulated Robot Arm).

In yet another aspect, the order fulfillment system 210 can include shuttles which move through the ASRS and can move along conveyor system 225 and first picking station 214 and second picking station 216. Shuttles can move empty containers, inventory containers, and order containers along conveyor system 225 and first picking station 214 and second picking station 216 and can interface with gantry robots 224. Exemplary shuttles can be found in U.S. Patent Application Publication No. 2012/0328397A1.

Figure 4:
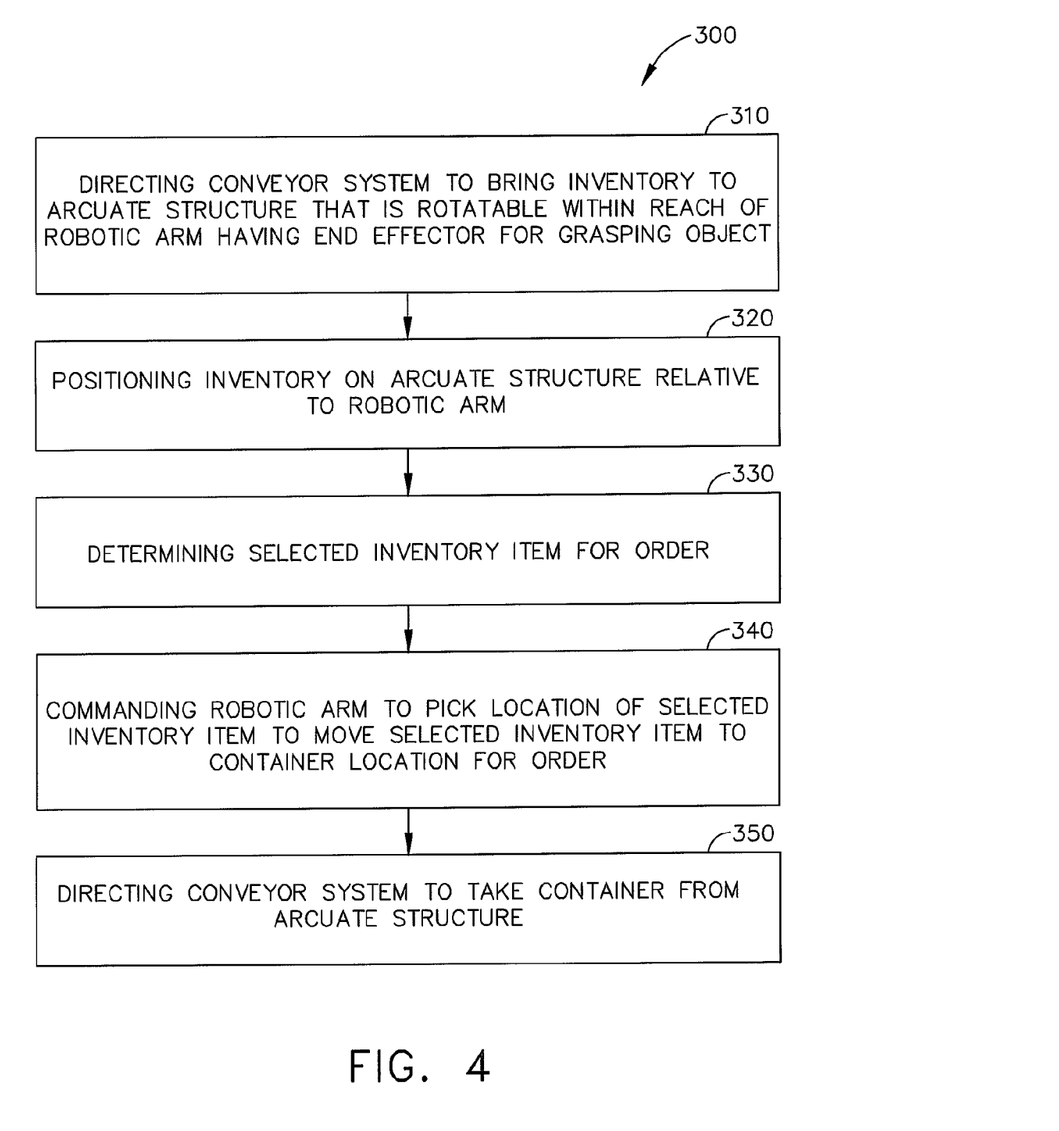
FIG. 4 illustrates a flow diagram of a methodology for order fulfillment according with an additional aspect of the present innovation.

In FIG. 4, a method 300 for order fulfillment is depicted according to one aspect of the innovation. A control system directs a conveyor system to bring inventory to an arcuate structure that is rotatable within reach of a robotic arm having an end effector for grasping an object (block 310). The control system positions the inventory on the arcuate structure relative to the robotic arm (block 320). The control system determines a selected inventory item for an order (block 330). The control system commands the robotic arm to move the selected inventory item from a pick location of the selected inventory item to a container location for the order (block 340). The control system directs the conveyor system to take the container from the arcuate structure (block 350).

In an exemplary aspect, the control system may direct more than one picking station. Fulfilling the order may be by picking another selected inventory item from the second picking station, and conveying a selected one of the container and the another selected inventory item between the first and second picking stations.

In another exemplary aspect, positioning the inventory on the arcuate structure may be by rotating the arcuate structure to align a selected position to a conveyor. For example, the control system may direct simultaneously rotating of the arcuate structure while commanding the robotic arm to a pick location of the selected inventory item to move the selected inventory item to a container location for the order.

It should be appreciated with benefit of the present disclosure that aspects of the present innovation may further apply to a movable gantry robot. For example, a robot may be attached for movement within a vertical X-Y plane ("grid"), such as a rectangular frame structure to which the robot can locate itself in three-dimensions, including to either lateral side of the frame structure. The frame structure may be moved into proximity to the inventory to increase the reach of the robot.

For instance, the movable gantry robot may be automatically inserted into a storage container or trailer for loading or unloading of inventory, such as stacked cartons. The grid may be maintained within reach of the current aft position of the stacked cartons as the robot end effector moves cartons between the stack and a distal end of a telescoping conveyor attached proximate to the grid.

In certain implementations, the grid may include actuators that contact one or more interior sides of the storage container or trailer in order to stabilize the robot relative to the inventory.

In accordance with various aspects of the disclosure, an element, or any portion of an element, or any combination of elements may be implemented with a "processing system" that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing system may execute instructions. A processing system that executions instructions to effect a result is a processing system which is configured to perform tasks causing the result, such as by providing instructions to one or more components of the processing system which would cause those components to perform acts which, either on their own or in combination with other acts performed by other components of the processing system would cause the result. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. Computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

EXPLICIT DEFINITIONS

"Processor" means devices which can be configured to perform the various functionality set forth in this disclosure, either individually or in combination with other devices. Examples of "processors" include microprocessors, microcontrollers, digital signal processors (DSPs), field programmable gate arrays (FPGAs), programmable logic devices (PLDs), programmable logic controllers (PLCs), state machines, gated logic, and discrete hardware circuits. The phrase "processing system" is used to refer to one or more processors, which may be included in a single device, or distributed among multiple physical devices.

"Instructions" means data which can be used to specify physical or logical operations which can be performed by a processor. Instructions should be interpreted broadly to include, code, code segments, program code, programs, subprograms, software modules, applications, software applications, software packages, routines, subroutines, objects, executables, threads of execution, procedures, functions, hardware description language, middleware, etc., whether encoded in software, firmware, hardware, microcode, or otherwise.

A statement that a processing system is "configured" to perform one or more acts means that the processing system includes data (which may include instructions) which can be used in performing the specific acts the processing system is "configured" to do. For example, in the case of a computer (a type of "processing system") installing Microsoft WORD on a computer "configures" that computer to function as a word processor, which it does using the instructions for Microsoft WORD in combination with other inputs, such as an operating system, and various peripherals (e.g., a keyboard, monitor, etc. . . . ).

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim

What is claimed is:

1. An order fulfillment system, comprising:
    a robotic arm having an end effector for grasping an object;
    an arcuate structure moveable within reach of the robotic arm, the arcuate structure comprising an upper arcuate structure and a lower arcuate structure;
    a conveyor system to bring inventory to pick from to the arcuate structure and to take a container that holds picked inventory away from the arcuate structure;
    a control system for fulfilling an order by
        directing the conveyor system to bring inventory to pick from to the arcuate structure,
        positioning the inventory to pick from on the arcuate structure relative to the robotic arm,
        determining a selected inventory item for an order,
        commanding the robotic arm to move the selected inventory item from a pick location of the selected inventory item to a container location for the order, wherein the pick location and container location are within reach of the robotic arm, and
        directing the conveyor system to take the container from the arcuate structure,
    wherein the inventory and the container for the order are on different ones of the upper and lower arcuate structures.

2. The order fulfillment system of claim 1, wherein the robotic arm and the upper and lower arcuate structures comprise a first picking station, the order fulfillment system further comprising a second picking station, wherein the control system is for fulfilling the order by picking another selected inventory item from the second picking station, and wherein the conveyance system further conveys a selected one of the container and the another selected inventory item between the first and second picking stations.

3. The order fulfillment system of claim 1, further comprising an automated storage and retrieval system attached to the conveyor system.

4. The order fulfillment system of claim 1, and wherein the container location includes a container and the robotic arm moves the selected inventory item into the container for the order.

5. The order fulfillment system of claim 3, wherein the selected inventory item is moved when the pick location and container location are within reach of the robotic arm.

6. The order fulfillment system of claim 1, wherein the robotic arm picks orders and processes orders from moving containers.

7. The order fulfillment system of claim 1, wherein at least one of the upper and lower arcuate structures comprises a ring turntable.

8. The order fulfillment system of claim 7, wherein the ring turntable comprises a cross belt loop sorter.

9. The order fulfillment system of claim 1, wherein the control system further positions the inventory on the upper and lower arcuate structures by rotating the upper and lower arcuate structures to align a selected position to a conveyor.

10. The order fulfillment system of claim 9, wherein the control system simultaneously moves the upper and lower arcuate structures while commanding the robotic arm to move the selected inventory item from the pick location of the selected inventory item to a container location for the order.

11. An order fulfillment system, comprising:
    a first robotic arm having an end effector for grasping an object;
    a second robotic arm having an end effector for grasping an object, each of the robotic arms positionable to reach a respective portion of the arcuate structure;
    an arcuate structure moveable within reach of the robotic arm the arcuate structure comprising an upper arcuate structure and a lower arcuate structure;

a conveyor system to bring inventory to pick from to the arcuate structure and to take a container that holds picked inventory away from the arcuate structure; and a control system for fulfilling an order by:
directing the conveyor system to bring inventory to pick from to the arcuate structure,
positioning the inventory to pick from on the arcuate structure relative to a selected one of the first and second robotic arms,
determining a selected inventory item for an order,
commanding the selected one of the first and the second robotic arms to move the selected inventory item from a pick location of the selected inventory item to a container location for the order, wherein the pick location and container location are within reach of the selected one of the first and the second robotic arm, and
directing the conveyor system to take the container from the arcuate structure.

12. The order fulfillment system of claim 11, wherein the first and second robotic arms and the arcuate structure comprise a first picking station, the order fulfillment system further comprising a second picking station, wherein the control system is for fulfilling the order by picking another selected inventory item from the second picking station, and wherein the conveyance system further conveys a selected one of the container and the another selected inventory item between the first and second picking stations.

13. The order fulfillment system of claim 11, further comprising an automated storage and retrieval system attached to the conveyor system.

14. The order fulfillment system of claim 11, and wherein the container location includes a container and the robotic arm moves the selected inventory item into the container for the order.

15. The order fulfillment system of claim 11, wherein each of the first and second robotic arms pick orders and processes orders from moving containers.

16. The order fulfillment system of claim 11, wherein the arcuate structure comprises a ring turntable.

17. The order fulfillment system of claim 16, wherein the ring turntable comprises a cross belt loop sorter.

18. The order fulfillment system of claim 11, wherein the control system further positions the inventory on the arcuate structure by rotating the arcuate structure to align a selected position to a conveyor.

19. The order fulfillment system of claim 18, wherein the control system simultaneously moves the arcuate structure while commanding a selected one of the robotic arms to move the selected inventory item from the pick location of the selected inventory item to a container location for the order.

20. A method for order fulfillment, comprising:
directing a conveyor system to bring inventory to pick from to an arcuate structure that is moveable within reach of a robotic arm having an end effector for grasping an object, the arcuate structure having an upper arcuate structure and a lower arcuate structure;
positioning the inventory to pick from on the arcuate structure relative to the robotic arm;
determining a selected inventory item for an order;
commanding the robotic arm to move the selected inventory item from a pick location of the selected inventory item ad to pace the selected inventory into a container location for the order; and
directing the conveyor system to take the container from the arcuate structure;
wherein the inventory and the container for the order are on different ones of the upper and lower arcuate structures.

21. The method of claim 20, wherein the robotic arm and a selected one of the u per and lower arcuate structures comprise a first picking station, the order fulfillment system further comprising a second picking station on a selected one of the upper and lower arcuate structures, wherein fulfilling the order by picking another selected inventory item from the second picking station, and conveying a selected one of the container and the another selected inventory item between the first and second picking stations.

22. The method of 20, further comprising conveying inventory from an automated storage and retrieval system attached to the conveyor system.

23. The order fulfillment system of claim 20, wherein the robotic arm can pick orders and processes orders from moving containers on the upper and lower arcuate structures.

24. The method of claim 20, wherein at least one of the upper and lower arcuate structures comprise a ring turntable.

25. The method of claim 24, wherein at least one of the ring turntables comprise a cross belt loop sorter.

26. The method of claim 20, further comprising positioning the inventory on the arcuate structure by rotating at least one of the arcuate structures to align a selected position to a conveyor.

27. The method of claim 26, further comprising simultaneously moving at least one arcuate structure while commanding the robotic arm to move the selected inventory item from the pick location of the selected inventory item to a container location for the order.

28. A method for order fulfillment, comprising:
directing a conveyor system to bring inventory to pick from to an arcuate structure that is moveable within reach of a first robotic arm and a second robotic arm with each of the robotic arms having an end effector for grasping an object and each of the robotic arms positionable to reach a respective portion of the arcuate structure, the arcuate structure having an upper arcuate structure and a lower arcuate structure;
positioning the inventory to pick from on the arcuate structure relative to the robotic arm;
determining a selected inventory item for an order;
commanding the robotic arm to move the selected inventory item from a pick location of the selected inventory item and to place the selected inventory into a container location for the order; and
directing the conveyor system to take the container from the arcuate structure.

29. The method of claim 28, wherein a selected one of the first and second robotic arms and the arcuate structure comprise a first picking station, the order fulfillment system further comprising a second picking station, wherein fulfilling the order by picking another selected inventory item from the second picking station, and conveying a selected one of the container and the another selected inventory item between the first and second picking stations.

30. The method of claim 28, further comprising conveying inventory from an automated storage and retrieval system attached to the conveyor system.

31. The order fulfillment system of claim 28, wherein the selected inventory item is moved when the pick location and container location are within reach of the first and second robotic arms.

32. The order fulfillment system of claim 28, wherein each of the robotic arms can pick orders and processes orders from moving containers on the upper and lower arcuate structures.

33. The method of claim 28, wherein the arcuate structure comprises a ring turntable.

34. The method of claim 33, wherein the ring turntable comprises a cross belt loop sorter.

35. The method of claim 28, further comprising positioning the inventory on the arcuate structure by rotating the arcuate structure to align a selected position to a conveyor.

36. The method of claim 35, further comprising simultaneously moving the arcuate structure while commanding a selected one of the first and second robotic arms to move the selected inventory item from the pick location of the selected inventory item to a container location for the order.

* * * * *